E. FAVARY.
RESILIENT TIRE.
APPLICATION FILED APR. 24, 1915. RENEWED JUNE 12, 1920.
1,363,857.
Patented Dec. 28, 1920.
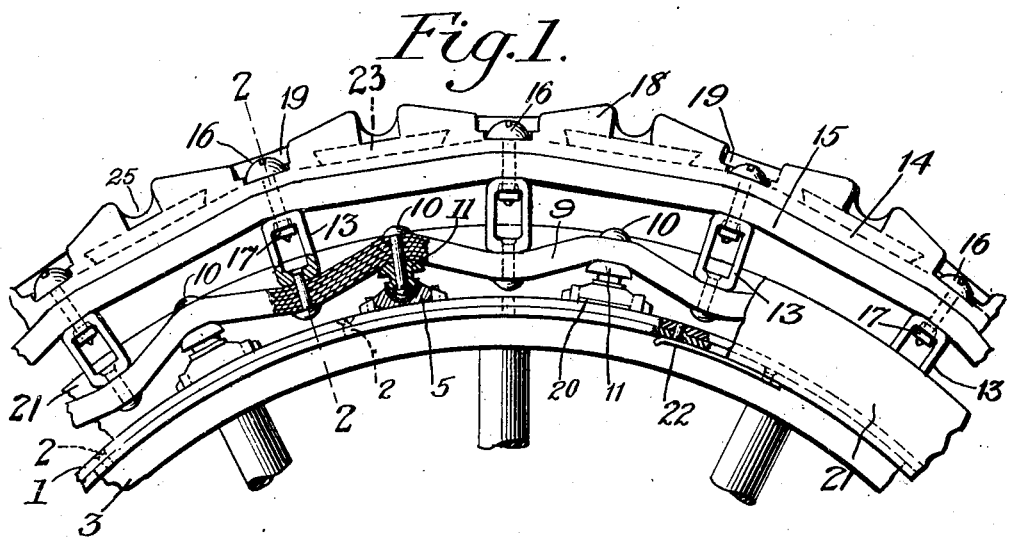
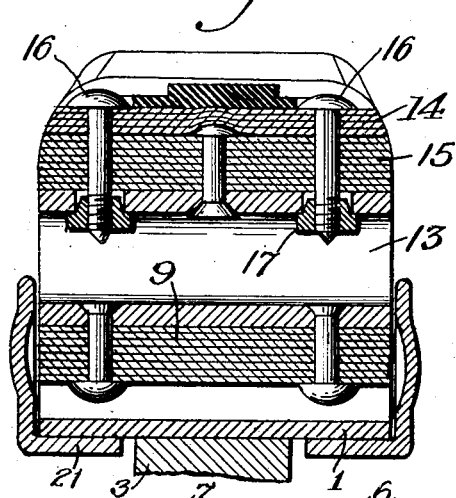
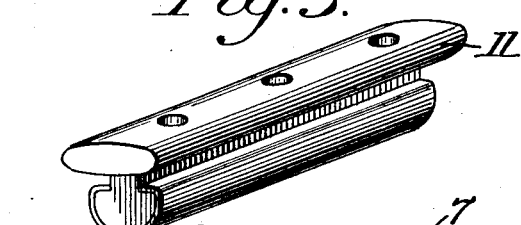
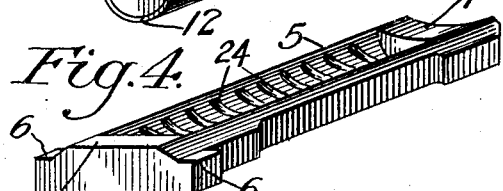
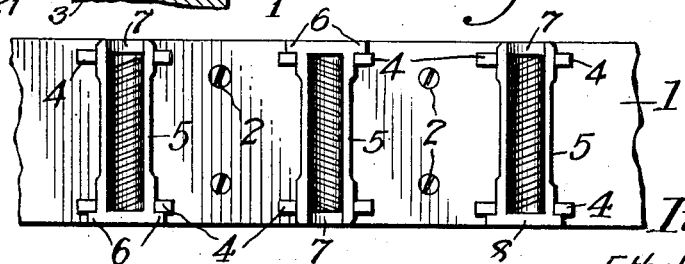
Inventor
Ethelbert Favary

UNITED STATES PATENT OFFICE.

ETHELBERT FAVARY, OF NEW YORK, N. Y.

RESILIENT TIRE.

1,363,857.         Specification of Letters Patent.     Patented Dec. 28, 1920.

Application filed April 24, 1915, Serial No. 23,571. Renewed June 12, 1920. Serial No. 388,669.

*To all whom it may concern:*

Be it known that I, ETHELBERT FAVARY, a subject of the King of Hungary, whose post-office address is 559 West 164th St., city, county, and State of New York, have invented certain new and useful Improvements in Resilient Tires; and I do hereby declare the following to be a full, clear, and exact description of the invention, such as will enable others skilled in the art to which it appertains to make and use the same.

The present invention relates to resilient tires of the kind disclosed in my United States Patent No. 981,253 of January 10, 1911, wherein a plurality of circumferentially-extending pliable bands are fastened to rigid supports in staggered relation between adjacent bands. The resiliency of such a tire depends in some measure upon the number of bands, but I have found that the resiliency may be increased with the same number of bands, or made practically the same with fewer bands, by making the longitudinal tension in the intermediate band or bands more than in the tread-carrying band, instead of dividing the longitudinal tension necessary for supporting the external load about equally among all the bands. Furthermore, I have found that by decreasing the tension in the tread-carrying band, the accommodation of the tire, that is, its ability to be deformed by obstructions, is increased because the tread-carrying band does not begin to deform the intermediate band or bands until the tire is subjected to external load or encounters an obstruction. Furthermore, the life of the tire is increased by decreasing the tension in the tread-carrying band, because by removing the tendency of this band to stretch, even though some strong inelastic material (as compared with rubber) is used, the tendency of the rubber tread to pull away from the fabric on which it is vulcanized, is less, and the rubber being untensioned is not so easily cut or damaged in service.

The result of this construction is that the lasting qualities, as well as the riding characteristics, may be improved by decreasing the longitudinal tension in the tread-carrying band, provided that the necessary additional tension be given to the remaining bands or to one of the remaining bands. Furthermore, where the tire includes more than one band inside of the tread-carrying band, I have found that it is not only advantageous to reduce the tension in the tread-carrying band, as aforesaid, but it is also advisable to make the length of the innermost band considerably greater than a circumference drawn through its points of support, so that there will be a substantial dip in the stretches between adjacent supports. Thus, in resilient tires of this kind having three bands, I find that better results than heretofore are obtained by providing sufficient tension in the intermediate band to furnish the principal means for supporting the external load on the tire, the tread-carrying band having just sufficient tension to keep it tight from rattling, and the inner band having dipped stretches capable of considerable depression. Practice has shown that not only is the mileage to be expected from the tread of a tire arranged in this way, considerably increased, but the tire has greater accommodation without any accompanying decrease in its resiliency. This characteristic of great accommodation combined with great resiliency is of the utmost importance in vehicle tires, and it is furthered by the construction shown herein because when the intermediate band is under great tension so that the stretches between adjacent supports are straight or practically straight, a given load will produce a greater depression of the stretch of the intermediate band upon which the load comes, thereby increasing the deformation and sensitiveness to light loads; and at the same time the fact that the stretches of the inner band, which is supported by the felly on blocks capable of a slight rocking movement in their sockets, are long enough to dip, gives rise to a lifting movement of adjacent stretches. This produces a tendency of the outer or inner structure of the tire to swell and protrude in front of and behind the obstruction. The swelling behind the obstruction decreases the power required to pass over the obstruction and the swelling in front of the obstruction tends to let the load down easily without bounce or rebound.

In fact, the riding characteristics are so enhanced by this arrangement that in a tire having three bands, I am enabled to lay the tread-carrying band directly on the intermediate band without interposing any supports therebetween, and still provide the great resiliency and accommodation required for moving vehicles. In this form, the axles of the vehicles are normally maintained at a constant elevation above the road by so constructing and forming the outer surface of the tread-carrying band that it depresses under load at the point of contact with the road in such manner as to produce this result, notwithstanding the fact that the tread-carrying band is directly laid on the series of straight stretches of the intermediate band.

In addition to the foregoing, the tire shown herein embodies certain other improvements permitting easier installation of the tire on the wheel and resulting in more effective holding power of the tire on the wheel, these additional improvements being likewise applicable to other tires of this general kind.

In the accompanying drawings illustrating the preferred form of my invention, employing, as an example, three circumferentially-extending pliable bands wherein the tread-carrying band is laid directly on the intermediate band, Figure 1 represents, principally in side elevation, but partly in section, a portion of my improved tire; Fig. 2 is a section on line 2—2 of Fig. 1; Fig. 3 is a perspective view of a rocking member, and Fig. 4 is a perspective view of the socket therefor; and Fig. 5 is a plan view showing the disposition of the sockets on the wheel rim.

The rim 1 is shrunk on the felly 3 and is fastened thereto by screws 2, and is provided with a plurality of abutments 4 adapted to maintain the aluminum sockets 5 in circumferentially spaced relation. Each of these sockets has side flanges 6 on one end designed to engage the side faces of the abutments 4, the other end of the socket being devoid of such a side flange so that it will pass between the abutments. Each socket also has an end wall 7 of less height than the opposite end wall 8 for a purpose that will appear hereinafter. The inner band 9 is fastened by the rivets 10 to a plurality of aluminum rocking members 11 having steel caps 12 and being arranged to set in the sockets 5 so as to provide therewith a plurality of circumferentially spaced supports capable of allowing a small amount of movement of the stretches of the inner band 9 relatively to the felly 3 in either circumferential direction. The inner surface of the socket contains blocks of graphite 24 baked in grooves therein to decrease friction. The hollow aluminum supporting blocks 13 are riveted to the inner band 9 in staggered relation with respect to the rocking supporting blocks. The tread-carrying band 14 is laid directly on the intermediate band 15, that is without the interposition of non-resilient separating blocks, and the two are fastened to the supporting blocks 13 by means of rivets and screws 16, the latter being screwed into the nuts 17.

The bands may be made of any suitable material, such as fabric, and of a cross section to withstand the necessary stress in operation. The three bands are covered with rubber or other suitable material for water-proofing purposes and the tread-carrying band 14 is provided with a tread 18 of molded rubber vulcanized thereon or of blocks of any other suitable material for contact with the road. In the drawings the portions 19 are of softer rubber and are incorporated with the molded tread to lie over the blocks 13. The dove tailed pieces 23 of fabric are incorporated with the tread so as to contact with the band 14 to thereby assist the tread in remaining in place. As the wheel rotates under external load, the raised portions of the tread 18 are depressed upon contact with the road and depress the adjacent stretches of the tread-carrying band 14 and the other bands 9 and 15, thereby maintaining the axle at approximately a constant elevation above the road, notwithstanding the fact that the tread-carrying band conforms to the series of the straight stretches of the intermediate band. The recess 25 in the tread 18 intermediate of the supports 13 reduces the stress in the rubber resulting from the dip in the tread-carrying band when contacting with the road or with an obstruction thereon.

The inner band 9 has a length substantially greater than the circle drawn through its points of support, and is made up of dipped stretches between adjacent supports. The intermediate band 15 is tensioned longitudinally so as to furnish the principal means for supporting the external load on the tire, and embodies substantially straight stretches between adjacent supports. The tread-carrying band 14 is untensioned or under less tension than the intermediate band 15, so that the rubber tread 18 will not be readily cut or torn in service and will not readily separate from the tread-carrying band on which it is vulcanized.

Even when the tread 18 is worn to its substantial limit, the tire is sufficiently deformable by reason of the supporting structure comprising the inner and intermediate bands and supports therefor, to provide the great accommodation necessary in vehicle tires for overcoming obstructions on the road. Furhermore, by tensioning the intermediate band 15 to furnish the principal means for supporting the external load on the tire, and by arranging the remaining bands as aforesaid, a given load will produce a greater depression of the stretches of the intermediate band 15 upon which the load comes, thereby increasing the deformation and sensitiveness to light loads; whereas the dipped stretches of the inner band 9 cause further depression of that stretch upon which the load bears directly to give rise to a lifting movement of the adjacent stretches of the inner band, thereby producing a tendency of the tire to swell or protrude in front of and behind the obstruction.

To obtain the desired relation of longitudinal tension in the intermediate and tread-carrying bands, I prefer to make the latter of slightly greater diameter than required to closely encompass the intermediate band, although if desired I may slip the tread-carrying band in a substantially untensioned condition directly over the tensioned intermediate band.

In assembling the tire, the rim 1 with its abutments 4 is fastened to the felly of the wheel and the three connected bands 9, 14 and 15 are pushed over the rim with the rocking supports 11 resting between the abutments 4. The sockets 5 are then put in place, one at a time, and alternately from opposite sides, by slightly lifting the inner band and then pushing the lower end wall 7 of each socket in turn underneath the rocking support and between the abutments 4 until the side flange 6 engages the abutments. The shims 20 are pushed into place, where necessary, to tension the tire structure to the point at which the desired resiliency and accommodation are attained, whereupon the tire structure is held firmly in place on the rim 1. The side flanges 21 are slipped into place and locked thereon by the spring fingers 22.

Having thus descirbed my invention, what I claim is:

1. The combination with a vehicle wheel, of a resilient tire therefor, comprising a supporting structure anchored on the rim of the wheel and made up of a plurality of circumferentially-extending pliable bands and non-resilient supports fastened thereto in staggered relation, and a circumferentially-extending substantially untensioned pliable tread-carrying band mounted on the supporting structure and connected thereto, the supporting structure being tensioned longitudinally on the rim of the wheel and furnishing the principal means for supporting the external load on the tire.

2. The combination with a vehicle wheel, of a resilient tire therefor, comprising a supporting structure anchored on the rim of the wheel and made up of a plurality of circumferentially-extending pliable bands and non-resilient supports fastened thereto in staggered relation, and a circumferentially-extending pliable tread-carrying band laid directly on the outer bands of the supporting structure and having a tread which increases in thickness from the supports and the periphery of which extends on the inside and the outside of a circle having its center at the center of the wheel to thereby normally maintain the axle of the wheel at a substantially constant elevation above the road when subjected to uniform external load.

3. The combination with a vehicle wheel, of a resilient tire therefor, comprising a supporting structure anchored on the rim of the wheel and made up of a plurality of circumferentially-extending pliable bands and non-resilient supports fastened thereto in staggered relation, and a circumferentially-extending pliable tread-carrying band laid directly on the outer band of the supporting structure, and a tread which increases in thickness from the supports and has a transversely-extending central recess for the purpose described.

4. The combination with a vehicle wheel having a plurality of circumferentially spaced abutments, of a resilient tire therefor, comprising a plurality of circumferentially-extending pliable bands, a plurality of non-resilient supports fastened thereto in staggered relation between adjacent bands, and a plurality of rocking supports anchoring the tire to the rim of the wheel and comprising a plurality of rocking members fastened to the innermost band and sockets therefor arranged between the abutments on the rim of the wheel, the sockets having side flanges on a single one of its ends to engage the abutments on the rim of the wheel for the purpose described.

5. The combination with a vehicle wheel having a plurality of circumferentially spaced abutments, of a resilient tire therefor, comprising a plurality of circumferentially-extending pliable bands, a plurality of non-resilient supports fastened thereto in staggered relation between adjacent bands, and a plurality of rocking supports anchoring the tire to the wheel and each comprising a rocking member fastened to the innermost band, and a socket supporting the rocking member and engaging the abutments, said socket having one end wall of lesser height than the opposite end wall for the purpose described.

6. The combination with a vehicle wheel having a plurality of circumferentially spaced abutments, of a resilient tire therefor, comprising a plurality of circumferentially-extending pliable bands, a plurality of non-resilient supports fastened thereto in staggered relation between adjacent bands, and a plurality of rocking supports anchoring the tire to the wheel and each comprising a rocking member fastened to the innermost band and a socket supporting the rocking member and engaging the abutments, said socket having side flanges on a single one of its ends designed to engage the abutments and also having an end wall of reduced height on the other end of the socket for the purpose described.

7. The combination with a vehicle wheel having a plurality of circumferentially spaced abutments; of a resilient tire therefor, comprising a supporting structure made up of a plurality of circumferentially-extending pliable bands and non-resilient supports fastened therebetween, and a circumferentially-extending tread-carrying band mounted on the supporting structure and connected thereto; and a plurality of circumferentially spaced rocking members anchoring the tire to the rim of the wheel, and comprising circumferentially spaced rocking supports and sockets supporting the rocking members and having side flanges on a single one of its ends designed to engage the abutments, said sockets having their side flanges disposed alternately on the two sides of the rim for the purpose described.

In testimony whereof I affix my signature.

ETHELBERT FAVARY.